June 24, 1930.    R. H. ROGERS    1,768,295
APPARATUS FOR TOWING, MOORING, AND THE LIKE
Filed March 17, 1923
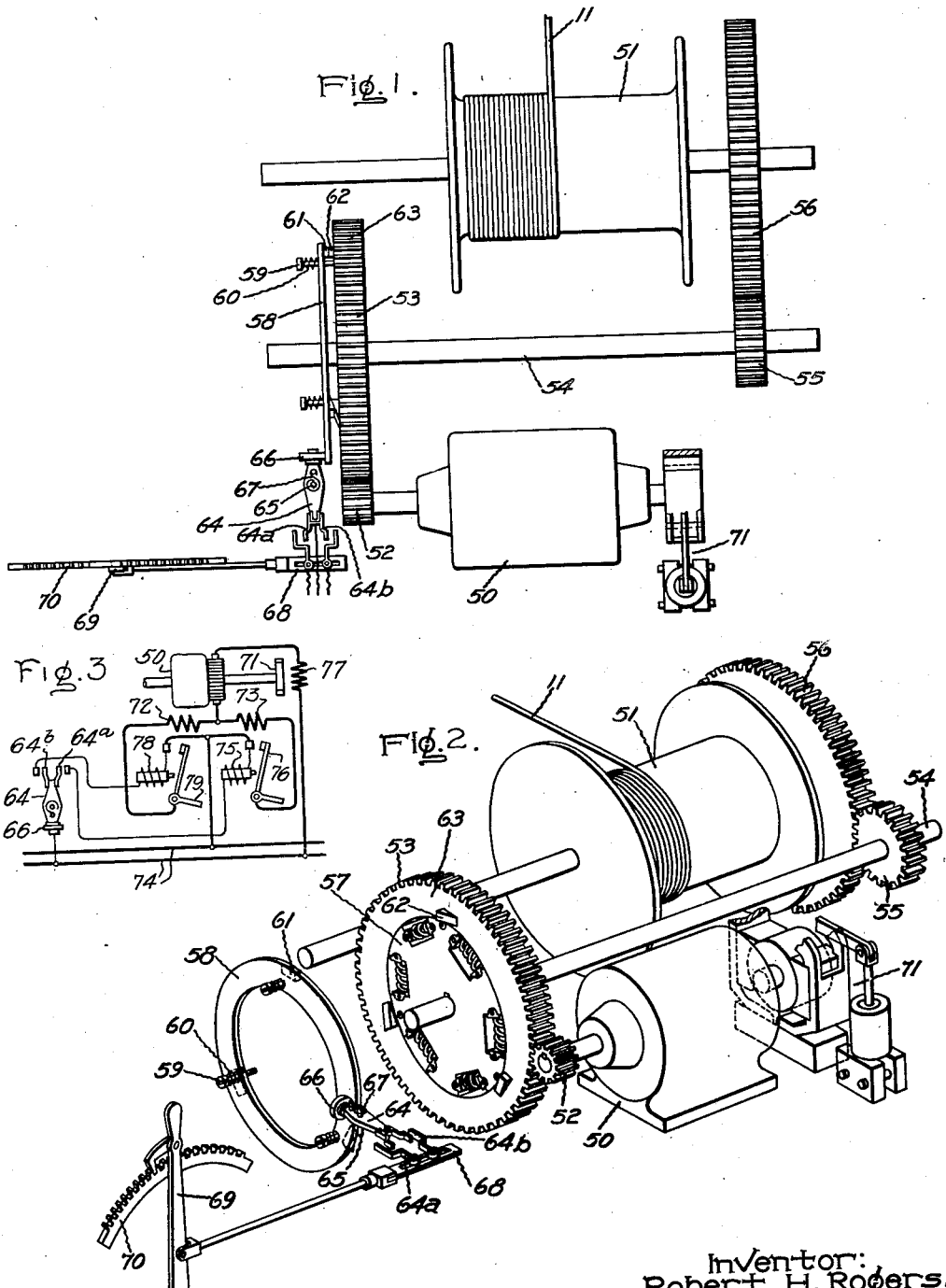
Inventor:
Robert H. Rogers,
by [signature]
His Attorney.

Patented June 24, 1930

1,768,295

UNITED STATES PATENT OFFICE

ROBERT H. ROGERS, OF SCHENECTADY, NEW YORK, ASSIGNOR TO GENERAL ELECTRIC COMPANY, A CORPORATION OF NEW YORK

APPARATUS FOR TOWING, MOORING, AND THE LIKE

Application filed March 17, 1923. Serial No. 625,895.

My invention relates to apparatus for towing, mooring, and the like and has for its object the provision of simple, reliable and efficient apparatus of this character and in which an electric motor may be used as the driving means.

More specifically my invention relates to apparatus associated with the towing or mooring cable for the purpose of taking in and giving out cable so as to prevent excessive strains on the cable. Such apparatus is especially needful, for example, in rough seas to prevent the cable from being broken due to the sudden movements of the vessel or vessels to which it is attached. My invention also relates to automatic anchor lifting apparatus.

In a commonly suggested form of towing and mooring apparatus, a friction clutch or brake is provided which is arranged to hold the drum under normal conditions but to slip to pay out cable and relieve the tension when it becomes abnormally high. One disadvantage of such a system is that the static friction of the clutch is indeterminate, depending on the condition of the clutch, and is approximately 40% greater under the best of conditions than the slipping friction for which the clutch is adjusted. A correspondingly great tension on the cable is, therefore, required to cause the clutch to slip. When the clutch is allowed to stand for a considerable length of time without being used, as is often the case, the static friction may become many times greater than the value previously indicated. Furthermore, the slipping friction varies with the condition of the clutch. Thus in the operation of such devices the cable is subjected to relatively high peaks in tension before the clutch slips, the tension quickly falling off after the clutch starts to slip to a value which is also variable. Another disadvantage of such systems is the time lag due to the inertia of the parts. Since the cable tension builds up very quickly, each surge seldom lasting over three seconds, the delay in paying out cable incident to the inertia of the apparatus also results in increased cable tension. This is particularly true when the cable in paying out carries with it the entire driving mechanism and motor. With such devices, therefore, the cable tension varies over a comparatively wide and indeterminate range requiring the cable and other parts of the apparatus to be of great strength.

In carrying out my invention I provide control means for the electric driving motor whereby the motor is caused to positively pay out cable upon the occurrence of a predetermined maximum tension. The action of the motor in paying out cable is practically instantaneous, whereby an increase in tension is relieved at its inception so that excessively high peaks are avoided. In one form of my invention I provide an electromagnetic brake for the motor which is controlled simultaneously with the motor so as to be applied to lock the motor when it is deenergized and released to permit the motor to operate freely in either direction to pay out or wind up cable.

For a better understanding of my invention reference should be had to the accompanying drawing in which Figs. 1 and 2 are views showing a form of my invention particularly adapted for mooring, and Fig. 3 is a diagrammatic view showing the control system for the electric drive motor.

Referring to Fig. 1 of the drawing, the mooring apparatus in one form of my invention comprises a drum 51 on which the towing cable 11 may be wound up which is operated by means of an electric driving motor 50, preferably of the series type.

In Figs. 1 and 2 I have shown mooring apparatus having the functions of the apparatus described in my copending application, Serial No. 743,836 filed October 15, 1924, but in which spur driving gears are used instead of a worm and worm gear. Obviously spur gears may be used in the towing apparatus of my said copending application. The series electric driving motor 50 is connected to the drum 51 by means of a small spur gear 52 on the motor shaft cooperating with a resiliently mounted or spring spur gear 53, thence through countershaft 54, spur gear 55 and spur gear 56.

The spring gear 53 is shown as of the form fully disclosed in detail in the patent to Asa F. Batchelder, No. 1,192,731, dated July 25, 1916. It will be understood that the rim 63 of the gear is loosely mounted on the hub 57 and is normally held in a predetermined angular relation with respect to the hub by means of springs, as shown in the drawing, which allow a limited spring resisted rotational movement of the rim 63 with respect to the hub. This relative movement may be in either direction. To the center or hub member 57 of the spring gear 53 is connected a ring 58 forming a control member for the motor in such manner that the ring 58 is held against rotation with relation to the hub member 57 and may be given movement of translation in an axial direction with relation thereto. The ring 58 may be connected to the hub member 57, for example, by means of three pins or screws 59 having springs 60 placed underneath their heads. On the inner face of ring 58 are equi-spaced wedge shaped cam members 61, three being shown, which cooperate with similar correspondingly spaced cams 62 secured to the rim 63 of the gear. Upon variation in the tension applied to cable 11 the hub 57 is caused to move with relation to its rim 63 whereby ring 58 is caused to move in an axial direction due to the cooperation of cams 61 and 62. In the arrangement shown, an increase in the tension of the cable causes the ring to move toward the right while a decrease in tension causes it to move toward the left.

Cooperating with the ring 58 is a switch arm 64 having a pivot 65, the switch arm being provided for the purpose of controlling the starting and stopping of the motor. The switch arm may, for example, be provided with a roller 66 which bears on the outer face of the ring 58. A suitable spring 67 is provided for biasing the switch arm so as to hold the roller 66 in engagement with the ring. Cooperating with the switch arm, which is in two branches, are two insulated stationary contacts 64$^a$ and 64$^b$. These stationary contacts are adjustably mounted on a movable supporting member 68. As shown the supporting member 68 is provided with a slot so as to permit adjustment of the stationary contacts. It is preferably made of insulating material. Member 68 may be adjusted by means of a handle 69 carrying a latch which cooperates with teeth in a curved member 70 so as to hold the handle in its adjusted position.

Contact arm 64 may be arranged to control the main circuit of the motor 50, but preferably it is arranged in a control circuit, as shown in Fig. 3, so as to selectively control the energization of differential series fields 72 and 73 with which the motor is provided and thus control the direction of rotation of the motor. When the contact arm is moved to engage stationary contact 64$^a$, circuit is closed across the source of supply 74 through operating coil 75 of the contactor 76 whereby this contactor is closed and a circuit for the motor thereby closed through the motor field 73, the armature of the motor and through the operating coil 77 of the brake 71. The motor thereupon starts up and operates in one direction as determined by the field winding 73, brake 71 having been released by the energization of its operating coil 77. Upon engagement of contact arm 64 with stationary contact 64$^b$ a circuit is closed through the operating coil 78 whereby the contactor 79 is closed and the circuit is thereby closed through differential field winding 72, the armature of the motor, and brake operating coil 77. This causes the motor to rotate in the opposite direction, the brake 71 being released as before. For the sake of simplicity, no starting resistances for the motor have been shown while the reversing of the motor is shown as effected by means of the differential field windings. Obviously any suitable control system for the motor may be employed in the place of that which is shown in Fig 3.

As thus constructed and arranged the operation of my invention is as follows: When the tension on the cable 11 is at the predetermined mean value which is to be maintained, or between predetermined limits, the ring 58 stands midway of its travel in an axial direction, and hence will hold contact arm 64 midway between its cooperating stationary contacts whereby the motor circuit is maintained open and the brake 71 is applied to secure the drum. Upon an increase in tension of the cable to a predetermined maximum as might be caused by pitching of the ship, ring 58 will move toward the right whereby the contact arm will engage with stationary contact 64$^a$ and start the motor in a direction to pay out cable until the tension has been relieved when ring 58 will be returned to its midposition, whereby the motor circuit is broken and brake 71 applied. Conversely, when the tension on the cable decreases to a predetermined minimum ring 58 will move outward toward the left causing contact arm 64 to engage with stationary contact 64$^b$ whereby the motor will be started in the opposite direction to take in cable until the predetermined mean tension has been established. By adjusting the positions of the stationary contact 64$^a$ and 64$^b$ with relation to each other on the supporting member 68 the amount of change in tension necessary to cause the motor to operate can be regulated. For example, by moving the contacts nearer together the change in tension required to cause the motor to operate will be decreased, and vice versa, if the contacts are moved farther apart the range in tension will be increased. By adjusting the position of the stationary contacts with relation to contact arm 64 by means of handle 69, the tension which is automatically maintained can be regulated. It will be observed that movement of the stationary contacts toward the left will increase the tension maintained while movement toward the right will reduce it.

In the towing and mooring apparatus the action of the electric motor in paying out cable is practically instantaneous upon the occurrence of a predetermined tension so that the tension is relieved before it has increased to an excessively high value. This instantaneous action is of particular importance in view of the rapid increase which takes place in the tension. The tension, when not relieved, will often suddenly build up 500 or 600 per cent and then as suddenly fall off, during the short period of three seconds. It will thus be observed that the tension increases very rapidly and the apparatus must act with a corresponding rapidity in paying out cable in order to prevent the tension from building up to its peak value. By means of my invention the cable tension may be limited to a definite value which value may be only slightly higher than the normal working tension of the cable. Relatively small cable and winding apparatus may thus be used.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. Apparatus for controlling the cable of a towing or mooring machine or the like, comprising a drum for winding up the cable, an electric motor, a driving connection between said motor and said drum including a member having cooperating parts relatively rotatable in response to the tension of the cable, and means operated responsively to the relative movement of said parts for controlling the energization of said motor.

2. Apparatus for controlling the cable of a towing or mooring machine or the like, comprising a drum for winding up the cable, a motor, a driving connection between said motor and said drum including a rotary driving member having cooperating parts rotating together about a common axis and relatively rotatable in response to the tension of the cable, a control member for the motor, and means for giving said control member movement of translation in response to relative movement of said parts to control the energization of said motor to pay out cable upon the occurrence of a predetermined tension.

3. Apparatus for controlling the cable of a towing or mooring machine or the like, comprising a drum for winding up the cable, an electric motor, a driving connection between said motor and said drum including a member having cooperating parts relatively rotatable in response to the tension of the cable, a control member for said motor, and means for giving said control member movement of translation in response to relative rotation of said parts to control the energization of said motor to pay out cable upon the occurrence of a predetermined maximum tension and to wind up cable upon the occurrence of a predetermined minimum tension whereby a predetermined mean tension is maintained.

4. Apparatus for controlling the cable of a towing or mooring machine or the like, comprising a drum for winding up the cable, an electric motor, a driving connection between said motor and said drum including a resiliently mounted gear having cooperating members relatively rotatable in response to the tension of the cable, a control member for said motor, and means comprising cooperating cam members for giving said control member movement of translation in response to relative rotation of the members of said gear to control the energization of said motor to pay out cable upon the occurrence of a predetermined maximum tension and to wind up cable upon the occurrence of a predetermined minimum tension whereby a predetermined mean tension is maintained, and a means controlled simultaneously with said motor for preventing rotation thereof when deenergized.

In witness whereof, I have hereunto set my hand this 16th day of March 1923.

ROBERT H. ROGERS.